(12) United States Patent
Karthik et al.

(10) Patent No.: US 8,254,588 B2
(45) Date of Patent: Aug. 28, 2012

(54) SYSTEM AND METHOD FOR PROVIDING STEP SIZE CONTROL FOR SUBBAND AFFINE PROJECTION FILTERS FOR ECHO CANCELLATION APPLICATIONS

(75) Inventors: Muralidhar Karthik, Singapore (SG); George Sapna, Singapore (SG); Anoop Kumar Krishna, Singapore (SG)

(73) Assignee: STMicroelectronics Asia Pacific Pte., Ltd., Singapore (SG)

( * ) Notice: Subject to any disclaimer, the term of this patent is extended or adjusted under 35 U.S.C. 154(b) by 783 days.

(21) Appl. No.: 12/288,922

(22) Filed: Oct. 24, 2008

(65) Prior Publication Data

US 2009/0123002 A1    May 14, 2009

Related U.S. Application Data

(60) Provisional application No. 61/002,897, filed on Nov. 13, 2007.

(51) Int. Cl.
H04B 3/20 (2006.01)
(52) U.S. Cl. ............................ 381/63; 381/66; 381/96
(58) Field of Classification Search .................. 381/63, 381/66, 96
See application file for complete search history.

(56) References Cited

U.S. PATENT DOCUMENTS

| | | | |
|---|---|---|---|
| 6,377,611 B1* | 4/2002 | Hwang | 375/140 |
| 6,608,897 B1* | 8/2003 | Jin et al. | 379/406.09 |
| 6,792,106 B1* | 9/2004 | Liu | 379/406.05 |
| 7,177,416 B1* | 2/2007 | Zhang et al. | 379/387.01 |
| 7,359,521 B1* | 4/2008 | Absar et al. | 381/94.2 |
| 7,672,445 B1* | 3/2010 | Zhang et al. | 379/406.01 |
| 7,725,323 B2* | 5/2010 | Padhi et al. | 704/500 |
| 7,873,510 B2* | 1/2011 | Kurniawati et al. | 704/200.1 |
| 2002/0041678 A1* | 4/2002 | Basburg-Ertem et al. | 379/406.01 |
| 2002/0114445 A1 | 8/2002 | Benesty et al. | |
| 2003/0185402 A1 | 10/2003 | Benesty et al. | |
| 2003/0202654 A1* | 10/2003 | Xiong | 379/406.01 |
| 2004/0071284 A1 | 4/2004 | Abutalebi et al. | |
| 2005/0094580 A1* | 5/2005 | Kumar et al. | 370/260 |
| 2005/0144017 A1* | 6/2005 | Kabi et al. | 704/500 |
| 2005/0152534 A1 | 7/2005 | Lipari, II et al. | |
| 2006/0002546 A1 | 1/2006 | Stokes et al. | |
| 2006/0002547 A1 | 1/2006 | Stokes et al. | |
| 2006/0039458 A1 | 2/2006 | Ding | |
| 2007/0058798 A1* | 3/2007 | Takada | 379/406.01 |
| 2007/0162277 A1* | 7/2007 | Kurniawati et al. | 704/200.1 |
| 2007/0195967 A1* | 8/2007 | Wu et al. | 381/63 |
| 2007/0255562 A1* | 11/2007 | Kurniawati et al. | 704/230 |
| 2007/0280472 A1 | 12/2007 | Stokes, III et al. | |
| 2008/0019539 A1* | 1/2008 | Patel et al. | 381/96 |
| 2008/0137875 A1* | 6/2008 | Zong et al. | 381/63 |
| 2008/0208538 A1 | 8/2008 | Visser et al. | |
| 2008/0247557 A1* | 10/2008 | Sudo et al. | 381/66 |
| 2008/0304600 A1 | 12/2008 | Bottomley | |
| 2008/0312914 A1 | 12/2008 | Rajendran et al. | |
| 2009/0123002 A1* | 5/2009 | Karthik et al. | 381/66 |
| 2010/0030529 A1* | 2/2010 | Nishiyama | 703/2 |
| 2011/0170683 A1* | 7/2011 | Lu et al. | 379/406.01 |

* cited by examiner

Primary Examiner — Laura Menz

(57) ABSTRACT

A system and method for Acoustic Echo Cancellation. The system and method include a subband affine projection filter and a variable step size controller configured to cancel an estimated echo from a near-end signal. The system and method also include a divergence detector adapted to reset the subband affine projection filter in response to determining a divergence is occurring. Additionally, the system and method include a double talk detector adapted to transmit a signal to mask an output signal when double talk is detected.

15 Claims, 10 Drawing Sheets

SYSTEM AND METHOD FOR PROVIDING STEP SIZE CONTROL FOR SUBBAND AFFINE PROJECTION FILTERS FOR ECHO CANCELLATION APPLICATIONS

CROSS-REFERENCE TO RELATED APPLICATION(S) AND CLAIM OF PRIORITY

The present application is related to U.S. Provisional Patent No. 61/002,897, filed Nov. 13, 2007, entitled "SYSTEM AND METHOD FOR PROVIDING STEP SIZE CONTROL FOR SUBBAND AFFINE PROJECTION FILTERS FOR ECHO CANCELLATION APPLICATIONS". Provisional Patent No. 61/002,897 is assigned to the assignee of the present application and is hereby incorporated by reference into the present application as if fully set forth herein. The present application hereby claims priority under 35 U.S.C. §119(e) to U.S. Provisional Patent No. 61/002,897.

TECHNICAL FIELD

This disclosure is generally directed to systems and methods for echo cancellation in electronic devices.

BACKGROUND OF THE INVENTION

Echo cancellation is used in telephone communications to describe the process of removing echo from a voice communication in order to improve voice quality on a telephone call.

SUMMARY OF THE INVENTION

A system for Acoustic Echo Cancellation is disclosed. The system includes a near-end interface comprising a microphone and a speaker. The system further includes a far-end interface and an acoustic cancellation device coupled between the near-end interface and the far-end interface. The acoustic cancellation device is configured to use a subband affine projection process wherein at least one a of a step size and a regularization factor is determined by a variable step size controller.

A method for Acoustic Echo Cancellation is disclosed. The method comprises estimating an echo from a received signal using a subband affine projection filter. The echo is estimated by determining at least one of an optimal step size and an optimal regularization factor. The method further includes cancelling the estimated echo from a near-end signal to produce an AEC output signal The method further includes detecting a divergence of the subband affine projection filter and resetting the subband affine projection filter in response to determining a divergence is occurring. Additionally, the method includes detecting a double talk and masking an output signal when double talk is detected.

An apparatus for acoustic echo cancellation is disclosed. The apparatus includes a near-end interface, a far-end interface and an adaptive filter coupled between the near-end interface and the far-end interface. The apparatus further includes a variable step size controller coupled to the adaptive filter. The variable step size controller is configured to determine an optimal step size or an optimal regularization factor for use by the adaptive filter.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 1A:
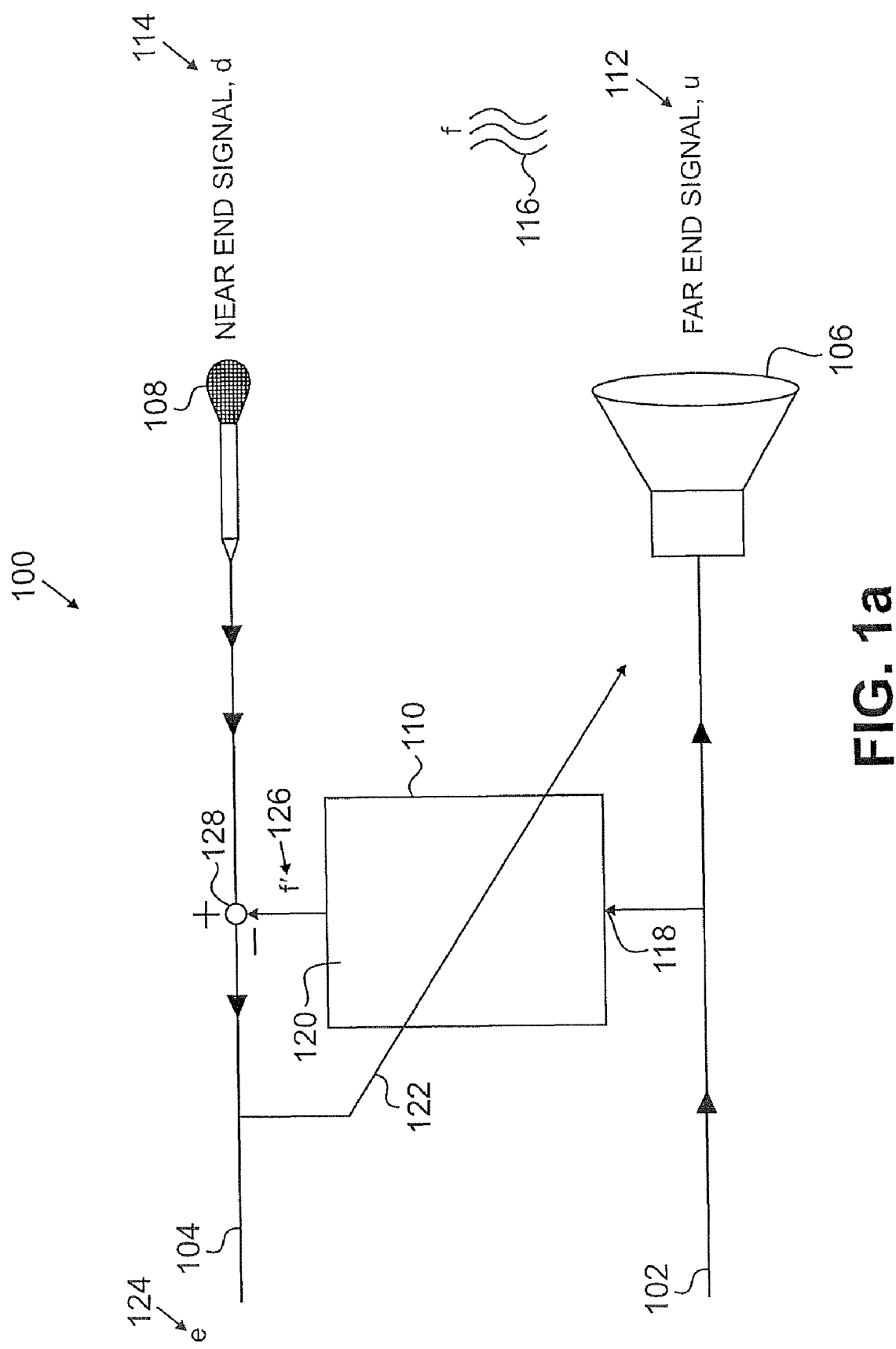
FIG. 1a illustrates an exemplary acoustic echo canceller according to one embodiment of the present disclosure.

While this disclosure has described certain embodiments and generally associated methods, alterations and permutations of these embodiments and methods will be apparent to those skilled in the art. Accordingly, the descriptions of example embodiments do not define or constrain this disclosure. Other changes, substitutions, and alterations are also possible without departing from the spirit and scope of this disclosure, as defined by the following claims.

DETAILED DESCRIPTION

FIGS. 1a through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless or wireline communication network.

In addition to improving subjective quality, the echo cancellation process increases the capacity achieved through silence suppression by preventing echo from traveling across a network.

Echo can be described in two forms: acoustic echo and hybrid echo. Speech compression techniques and digital processing delay often make these echoes more severe in telephone networks.

Echo cancellation involves first recognizing the originally transmitted signal that re-appears, with some delay, in the transmitted or received signal. Once the echo is recognized, it can be removed by "subtracting" it from the transmitted or received signal. This technique is generally implemented using a digital signal processor (hereinafter "DSP"), but can also be implemented in software. Echo cancellation is done using either echo suppressors or echo cancellers, or in some cases both.

Acoustic echo cancellation: Acoustic echo arises when sound from a loudspeaker—for example, the earpiece of a telephone handset, is picked up by the microphone in the same room—for example, the microphone in the very same handset. The problem exists in any communications scenario where there is a speaker and a microphone. Examples of acoustic echo are found in everyday surroundings such as:

Hands-free car phone systems;
A standard telephone in speakerphone or hands-free mode;
Conference phones;
Installed room systems which use ceiling speakers and microphones on the table; and
Physical coupling (e.g., vibrations of the loudspeaker transfer to the microphone via the handset casing).

Direct acoustic path echo occurs when direct sound from the loudspeaker (not the person at the far end—otherwise referred to as the "Talker") enters the microphone almost unaltered. Direct acoustic path echo occurs in most echo cases. The difficulties in cancelling acoustic echo stem from the alteration of the original sound by the ambient space. This alteration colors the sound that re-enters the microphone. These changes can include certain frequencies being absorbed by soft furnishings, and reflection of different frequencies at varying strength. These secondary reflections are not strictly referred to as echo, but rather are reverberation).

Acoustic echo is heard by the far end talkers in a conversation. Therefore, if a person in Room A talks, they will hear their voice bounce around in Room B. If this sound is not cancelled, it will get sent back to its origin. Due to the slight round-trip transmission delay, this acoustic echo can be very distracting.

Hybrid or Network echo is generated by the public switched telephone network (hereinafter "PSTN") through the reflection of electrical energy by a device called a hybrid. Most telephone local loops are two-wire circuits while transmission facilities are four-wire circuits. Each hybrid produces echoes in both directions, though the far end echo is usually a greater problem for voiceband.

This application relates to echo cancellation methods. Echo cancellation is very important in telephony networks such as Voice Over Internet Protocol (VOIP). Adaptive filters are used to provide echo cancellation. For a long tail length of echoes it is generally advisable to use a subband affine projection process. Adaptive filters can diverge. This means that the signal output of the echo cancellation unit will increase with time. This situation is very undesirable. A double talk detector is usually employed to detect the presence of double talk. Double talk occurs when near-end speech activity exists. When double talk is detected, the adaptation of the filter is frozen. Alternatively, a step size control logic can be employed that constantly determines and updates the optimum step size of the adaptive filter. The present invention provides step size control logic processes for subband affine projection adaptive filters that are very robust with respect to double talk and changing echo cancellation scenarios.

FIG. 1a illustrates an exemplary communication device 100 with Acoustic Echo Cancellation (hereinafter "AEC"). The communication device 100 includes communication interfaces 102, 104; a speaker 106; a microphone 108; and an adaptive filter 110.

The communication device 100 receives a far end signal ("u") 112 from a far end device (not illustrated) via communication input interface 102. The speaker 106 broadcasts (e.g. plays-out) the far end signal "u" 112. The far end signal "u" 112 projects throughout a room (not specifically illustrated) in which the communication device 100 is contained. The far end signal "u" 112 reflects off surfaces in the room. The reflections include a return of the full far end signal "u" 112 from certain surfaces and a return of a partial far end signal "u" 112 from other surfaces. Some surfaces may fully absorb the far end signal "u" 112, thus reflecting none of the far end signal "u" 112. The reflections of the far end signal "u" 112 form an echo "f" 116.

The microphone 108 senses the echo "f" 116, any voice inputs from a user, and any background noise. The echo "f" 116, voice inputs and background noise are sensed by the microphone 108 as a near end signal "d" 114 (the near end signal "d" 114 is also called double talk).

The adaptive filter 110 has a first interface 118, a second interface 120 and a third interface 122. The adaptive filter receives, via the first interface 118, the far end signal "u" 112. The adaptive filter 110 also receives, via the third interface 122, an error signal "e" 124. The adaptive filter 110 estimates and generates an estimated echo "f'"126. The adaptive filter 110 outputs estimated echo "f'"126 via second interface 120 to cancel the echo "f" 116 in near end signal "d" 114. The following equations represent an exemplary operation at a node 128.

$$d = f + v \text{ (e.g. local speech (or any local signal) +noise)} \quad \text{EQN (1)}$$

$$e = d - f' \quad \text{EQN (2)}$$

$$e = f - f' + v$$

The error signal "e" 124 is produced by canceling the estimated echo "f'"126 from the near end signal "d" 114. The acoustic echo cancellation device 100 transmits the error signal "e" 124 along communication output interface 104. As such, if the adaptive filter 110 is able to accurately generate estimated echo "f'"126 substantially equal to echo "f" 116, the error signal approaches a signal that substantially represents only voice and background noise. (e.g. if f'=f, then e=d).

Most speech is sampled at eight (8) kilohertz ("KHz"). Sampling at 8 KHz means that one-hundred-sixty (160) samples are taken every twenty (20) milliseconds ("ms") Each 20 ms segment is referred to as a block. Samples are denoted by x(n), where n is a time instant. For example, the first sample in the first block is denoted as x(1) and the second sample in the first block is denoted as x(2). The first sample in the second block, e.g., the one-hundred-sixty-first sample, is denoted as x(161) because it occurs at a time instant n=161.

At any time instant n, a matrix of the present and previous samples can be constructed. For example:

$$X(n) = \begin{bmatrix} x(n) & x(n-1) \\ x(n-1) & x(n-2) \\ x(n-2) & x(n-3) \end{bmatrix}$$

At n=512, the matrix would appear as:

$$X(512) = \begin{bmatrix} x(512) & x(511) \\ x(511) & x(510) \\ x(510) & x(509) \end{bmatrix}_{3 \times 2}$$

The dimension of the matrix is indicated at the bottom right hand corner. A 3×2 matrix is illustrated. However, it should be understood that may other sized matrices can be constructed. Vectors (row and column matrices) are illustrated in lower case while matrices are illustrated in uppercase. An identity matrix of dimension k×k is denoted as $I_k$. Additionally, zeros (1, N) is a row matrix of zeros. Some examples of matrices and matrix concatenation are:

$$\text{zeros}(1, 3) = \begin{bmatrix} 0 & 0 & 0 \end{bmatrix}$$

$$\text{zeros}(3, 1) = \begin{bmatrix} 0 \\ 0 \\ 0 \end{bmatrix}$$

$$\text{zeros}(2, 2) = 0_{2 \times 2} = \begin{bmatrix} 0 & 0 \\ 0 & 0 \end{bmatrix}$$

$$\text{ones}(1, 3) = \begin{bmatrix} 1 & 1 & 1 \end{bmatrix}$$

$$[\text{zeros}(1, 3) \; \text{ones}(1, 3)] = \begin{bmatrix} 0 & 0 & 0 & 1 & 1 & 1 \end{bmatrix}$$

$$[\text{zeros}(1, 3); \text{ones}(1, 3)] = \begin{bmatrix} \text{zeros}(1, 3) \\ \text{ones}(1, 3) \end{bmatrix} = \begin{bmatrix} 0 & 0 & 0 \\ 1 & 1 & 1 \end{bmatrix}$$

$$X = \begin{bmatrix} A & B & C \\ D & E & F \\ G & H & I \end{bmatrix}$$

$$Y = \begin{bmatrix} a & b & c \\ d & e & f \\ g & h & i \end{bmatrix}$$

$$X \otimes Y = \begin{bmatrix} Aa & bB & cC \\ dD & eE & fF \\ gG & hH & iI \end{bmatrix}$$

The sum of all elements of a matrix is given by SUM(.). Some additional matrix notation examples are:

$$A = \begin{bmatrix} 1 & 2 \\ 7 & 4 \end{bmatrix}$$

$$SUM(A) = 14$$

$$A_{1,2} = 2$$

$$A_{2,2} = 4$$

$$b = \begin{bmatrix} 4 \\ 6 \\ 9 \end{bmatrix}$$

$$b_2 = 6$$

Additionally, the $i^{th}$ element of vector "b" is denoted as $b_i$, while the ($i^{th}$, $j^{th}$) element of matrix "A" is denoted by $A_{ij}$. If the vector changes with time instant n, the vector is denoted as s(n) and the $i^{th}$ element is denoted as $s_i(n)$. Further, a trace of a matrix, TR (A), is the sum of the main diagonal elements. For example, TR(A)=1+4=5

An echo tail length is L samples (e.g. the adaptive filter 110 has L taps). A number ("b") of samples are set to zero (0) such that the first b taps are zero (0). The first b taps are set to zero by delaying the speaker 106 feed by b samples. A projection order in the full band is denoted by P. The number of subbands is M. A projection order in the subband is $P_s = P/M$. The subband adaptive filters have $L_s = L/M$ taps. A product of $P_s$ and the background noise at the near-end, in the absence of Double Talk (hereinafter "DT") is denoted by $\sigma^2$.

Figure 1B:
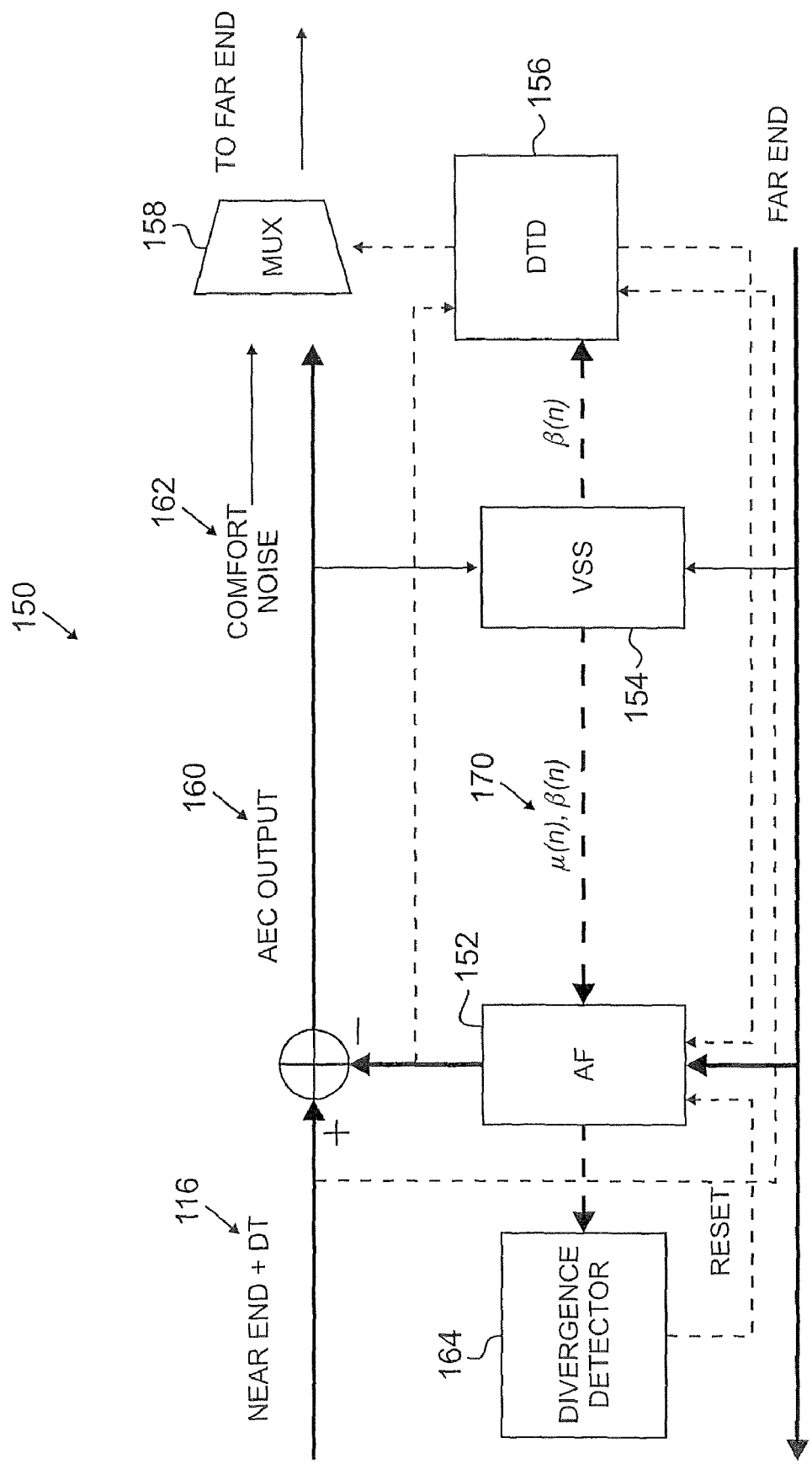
FIG. 1b illustrates a simple block diagram of an acoustic echo cancellation system according to one embodiment of the present disclosure.

Referring now to FIG. 1b, Acoustic Echo Cancellation 150 components of communications device 100 according to embodiments of the present disclosure are illustrated. The AEC 150 includes an Adaptive Filter 152 (hereinafter "AF"). The AF 152 estimates the echo and cancels it from the near-end signal. In one embodiment, the AF 152 is a Subband affine projection AF. The AEC 150 also includes a Variable Step Size controller 154 (hereinafter "VSS"). The VSS 154 controls the step size in the AEC 150. The VSS 154 is initially high. However, over a time period, the VSS 154 takes low values. Additionally, the VSS 154 has very low values during silence periods of the echo or during the presence of DT. In additional embodiments, a different manifestation of the step size, called a regularization factor, is utilized.

The VSS 154 includes a processor or special purpose controller adapted to perform a series of functions necessary to control the step size in the AEC 150. The VSS 154 also includes a storage means configured to store a plurality of instructions configured to cause the processor to perform the series of functions. The storage means can be any computer readable medium, for example, the storage means can be any electronic, magnetic, electromagnetic, optical, electrooptical, electromechanical, and/or other physical device that can contain, store, communicate, propagate, or transmit a computer program, software, firmware, or data for use by the microprocessor or other computer-related system or method.

The AEC 150 also includes a Double Talk Detector 156 (hereinafter "DTD"). The DTD 156 is configured to output a "1" if the DTD 156 detects double talk. The DTD 156 outputs a "0" if no DT is detected. The outputs of the DTD 156 are passed through a MUX 158 to mask the output 160 of the AEC 150. If the DTD 156 detects DT, the AEC output 160 is not masked. However, if no DT is detected by the DTD 156, the AEC output 160 is masked by the MUX 158 receiving the "0" signal from the DTD 156. The AEC output 160 is masked completely because it may have a residual echo. As a result, a comfort noise 162 is sent to the far end.

Further, the AEC 150 includes a Divergence Detector 164. The Divergence Detector 164 is configured to detect if the AF 152 is diverging. If the AF 152 is diverging, the Divergence Detector 164 is further configured to reset the AF 152.

Embodiments of the present disclosure comprise step size control logic processes to control the step size within the VSS 154. Some step size control logic processes are: Method of delay coefficients; Nonparametric variable step size control logic for fullband NLMS; and Variable regularization step size control. The processes can be implemented using the processor or special purpose controller.

For the Method of delay coefficients, a variety of step size control logic for full band NLMS processes are given. In particular the method of "delay coefficients" makes use of the tap weight error of the first few taps to compute the optimum step size. In this method, an artificial delay is introduced into the system by delaying the input of far end signal to the loudspeaker by a few samples.

In Variable regularization step size control, step size is one way of calculating the adaptation update of the adaptive filter. Normally there is a division/matrix inversion to be computed in the tap update of the adaptive filter. To prevent division by zero or inversion of a singular matrix, a small regularization factor is added. The tap update corresponds to a constant regularization factor and continuous update of the step size. An alternative would be to fix the step size and continuously update the regularization factor. Both forms are equivalent.

Generally, it is preferred that the adaptive filter converges quickly. The RLS filter has a quicker convergence than the LMS filter. However the complexity of the RLS filter is higher than that of the LMS filter. In some embodiments, a class of adaptive filters, referred to as Affine projection filters, are used. They have RLS-like convergence with LMS-like complexity.

When the tail length of the echo is high, it requires huge filters with many taps and this increases the complexity. Subband adaptive filters are used to improve convergence speed and reduce the complexity.

Figure 2:
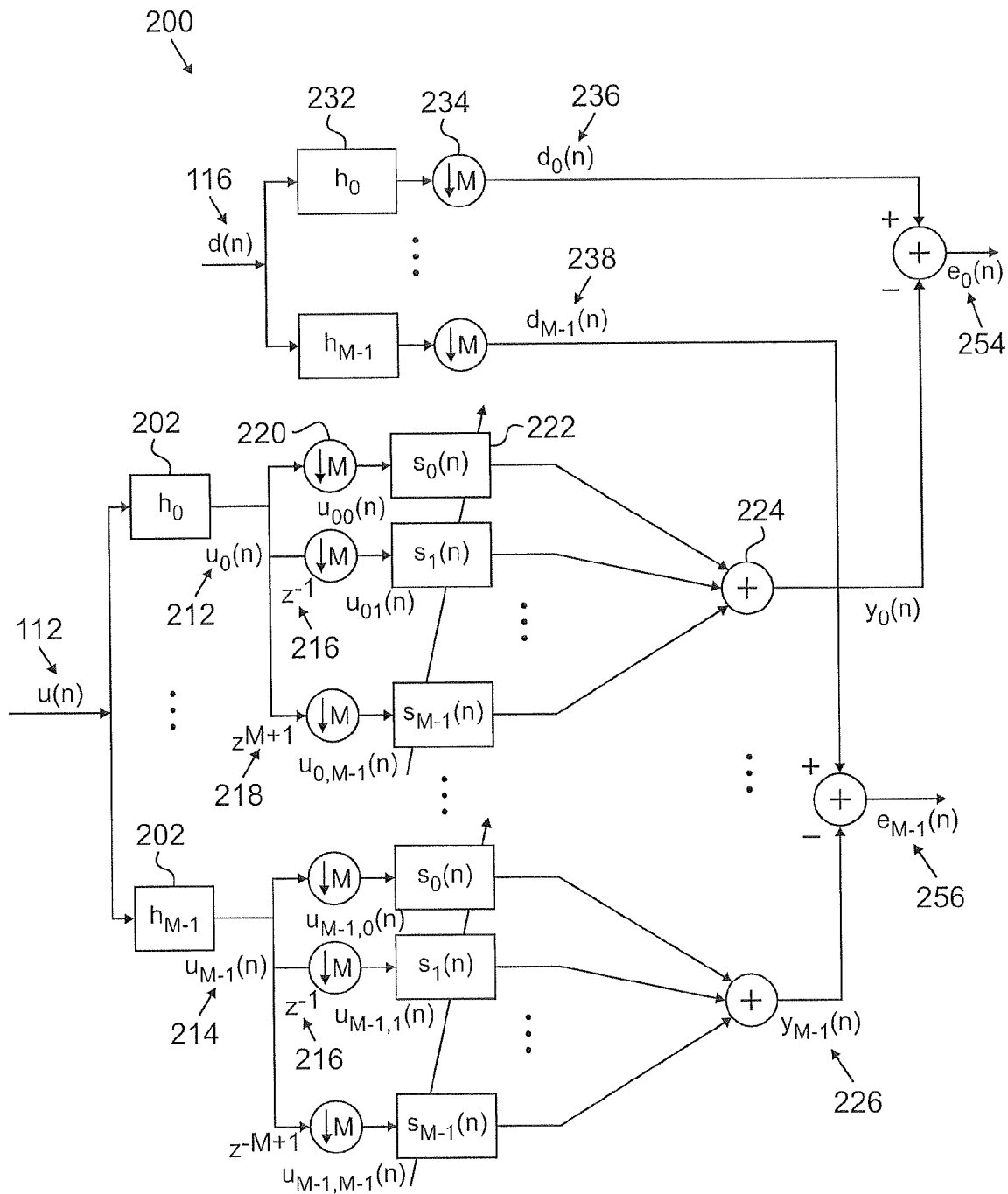
FIG. 2 illustrates an exemplary circuit for a Subband Affine Projection process according to one embodiment of the present disclosure.

Referring now to FIG. 2, an exemplary circuit for a Subband Affine Projection process 200 according to one embodiment of the present disclosure is illustrated. A far end signal $u(n)$ 112 is input to a set of analysis filters $h_0, h_1, \ldots, h_{M-1}$ 202. The analysis filters 202 yield M subband signals $u_0(n)$ 212, ..., $u_{M-1}(n)$ 214. Each subband signal 212-214 is split into M parallel signals 212, 216, 218. Each parallel signal 212, 216, 218 is a delayed version of a preceding signal. For example, the first subband signal $u_0(n)$ 212 is split into M parallel signals, $u_0(n)$ 212 and $u_0(n) z^{-1}$ 216 to $u_0(n) z^{-M+1}$ 218. In such example, $z^{-1}$ 216 is a delay of $u_0(n)$ 212 and $z^{-M+1}$ 218 is a M-1 delay of $u_0(n)$ 212. The parallel signals 212, 216, 218 are input into M decimators 220 and M adaptive filters 222 $s_0(n), s_1(n) \ldots s_{M-1}(n)$. The output of the adaptive filters 222 are summed 224 to yield $y_0(n)$.

The near end signal $d(n)$ 116 is input into a set of analysis filters $h_0, \ldots, h_{M-1}$ 232. The outputs of the analysis filters 232 are passed through M decimators 234 to yield M subband signals $d_0(n)$ 236, ..., $d_{M-1}(n)$ 238. Thereafter, M subband error signals $e_0(n)$ 254, ..., $e_{M-1}(n)$ 256 are computed using $d_0(n)$ 236, ..., $d_{M-1}(n)$ 238 and $y_0(n)$ 224, ..., $y_{M-1}(n)$ 226 respectively.

It may be advantageous to set forth the calculations utilized by the processes in embodiments of the present disclosure. All calculations are performed at time instant n.

A mean-square tap error (hereinafter also "MSTE" and "MSTE(n)") $D^2(n)$ is calculated using Equation (3) below.

$$D^2(n) = \sum_{i=0}^{M-1} \sum_{j=0}^{\frac{b}{M}-1} s^2_{(i-1)*L_s+1+j}(n) \qquad \text{EQN (3)}$$

$U_{ij}(n)$ is a subband polyphase matrix ($SPM_{ij}$). There are $M^2$ such matrices (i,j=0 to M-1). $U_{ij}(n)$ is calculated using Equation (4) below.

$$U_{ij}(n) = \begin{bmatrix} u_{ij}(n) & u_{ij}(n-1) & \ldots & u_{ij}(n-P_s+1) \\ u_{ij}(n-1) & u_{ij}(n-2) & \ldots & \\ \vdots & \vdots & \ddots & \ldots \\ u_{ij}(n-L_s+1) & u_{ij}(n-L_s) & \ldots & u_{ij}(n-L_s+P_s+2) \end{bmatrix}_{L_s \times P_s} \qquad \text{EQN (4)}$$

$X^T(n)X(n)$ is a far end correlation matrix (FECM(n)). $X^T(n)X(n)$ is calculated from a far end matrix (FEM(n)) using Equation (5) below.

$$X(n) = \begin{bmatrix} U_{00}(n) & U_{10}(n) & \ldots & U_{(M-1)0}(n) \\ U_{01}(n) & U_{11}(n) & \ldots & \\ \vdots & \vdots & \ddots & \ldots \\ U_{0(M-1)}(n) & U_{1(M-1)}(n) & \ldots & U_{(M-1)(M-1)}(n) \end{bmatrix}_{ML_s \times MP_s} \qquad \text{EQN (5)}$$

$$FECM(n) = X^T(n)X(n) \qquad \text{EQN (6)}$$

$U_{ij}^T(n)U_{ij}(n)$ is a polyphase subband correlation matrix ($PSCM_{ij}$). There are $M^2$ such matrices (i,j=0 to M-1).

An inverse of the far end correlation matrix (IFECM(n)) is $\Pi^{-1}(n)$. $\Pi^{-1}(n)$ is calculated in Equation (7) below.

$$\Pi^{-1}(n) = [X^T(n)X(n) + \delta I_{MP_s}]^{-1} \qquad \text{EQN (7)}$$

An error correlation matrix (ECM(n)) is represented by $e^T(n)e(n)$.

$R_E(n)$ is an expectation of error correlation matrix (EECM(n)). $R_E(n)$ is calculated by Equation (8) below.

$$R_E(n) = \alpha R_E(n-1) + (1-\alpha)e(n)e^T(n) \qquad \text{EQN (8)}$$

An error power estimate (also referenced as Expectation of Error power, EEP(n), or "ecorre") is calculated using Equation (9) below.

$$ecorre = \alpha \cdot ecorre + (1-\alpha)e^T(n)e(n) \qquad \text{EQN (9)}$$

Background noise power (BNP(n)) is $\hat{\sigma}^2$. BNP(n) is estimated using Equation (10) or Equation (11) below.

$$\hat{\sigma}^2 = \max(\sigma^2, ecorre - \text{trace}(X^T(n)X(n))D^2(n)) \qquad \text{EQN (10)}$$

or $$BNP(n) = \max\left(\sigma^2, EEP(n) - \frac{1}{L}TR(FECM(n))MSTE(n)\right) \qquad \text{EQN (11)}$$

The near end signal power estimate (NESPE(n)) estimates the power of the near-end signal. The NESPE(n) is calculated by Equation (12) below:

$$NESPE(n) = 0.99 * NESPE(n-1) + 0.01 * d^2(n) \qquad \text{EQN (12)}$$

An estimated echo signal power (EESP(n)) is computed by Equation (13) below:

$$EESP(n)=0.99*EESP(n-1)+0.01*\{s^T(n)X(n)X^T(n)s(n)\} \quad \text{EQN (13)}$$

The near end matrix (nem(n)), error matrix (em(n)) and tap matrix (tm(n)) are calculated by Equations (14a), (14b), and (14c) respectively.

$$d(n)=[d_0(n)\ d_0(n-P_{s+1})\ d_{M-1}(n)\ d_{M-1}(n-P_s+1)]^T \quad \text{EQN (14a)}$$

$$s(n)=[s_0^T(n)\ s_0^T(n)]^T \quad \text{EQN (14b)}$$

$$e(n)=d(n)-X^T(n)s(n) \quad \text{EQN (14c)}$$

In the above equations, i and j each vary from 1 to M. The M error signals $e_0(n)$ 254, ..., $e_{M-1}(n)$ 256 and the $M^2$ signals $u_{ij}$ are used to update the taps of the M adaptive subband filters 222 at time instant (n+1).

Figure 3:
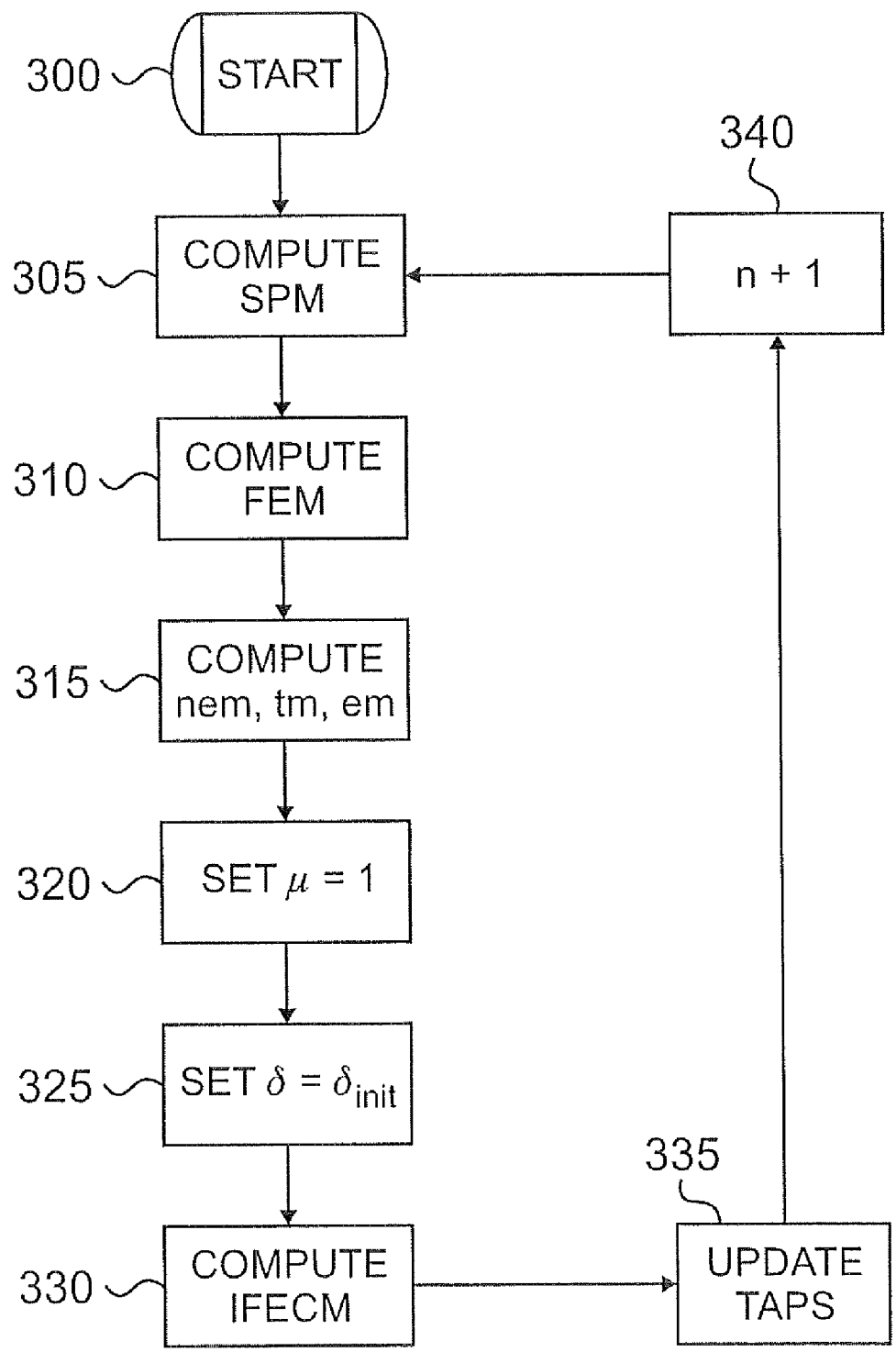
FIG. 3 illustrates a simple block diagram for updating taps using a Subband Affine Projection ("SAP") process according to one embodiment of the present disclosure.

Referring now to FIG. 3, the steps for updating taps using a Subband Affine Projection ("SAP") Process are illustrated. The process starts at step 300. A process initialization occurs at time instant n=0. During process initialization, $\delta_{init}$ is set to zero (0).

In step 305, the subband polyphase matrices are computed. The $SPM_{ij}$ are computed for i=0 to i=M-1 and for j=0 to j=M-1. For example, the $SPM_{ij}$ are computed for $SPM_{00}$, $SPM_{10}$, $SPM_{20}$, . . . , $SPM_{M-1,0}$, $SPM_{01}$, $SPM_{11}$, . . . , $SPM_{M-1,M-1}$. Additionally, $u_{ij}(n)$ can be computed recursively from $u_{ij}(n-1)$ by deleting the last column, shifting the first $p_s-1$ columns to the right and adding a new column as the first column.

The process moves to step 310 where FEM(n) is computed. After FEM(n) is computed, nem(n), tm(n) and em(n) are computed in step 315. The process uses Equations (14a), (14b) and (14c) above to compute nem(n), tm(n) and em(n).

The step size μ is set to one (1) in step 320 (e.g. μ=1). In step 325, the regularization factor δ is set to an initial value. The regulation factor is set such that $\delta=\delta_{init}$ Thereafter, the processor or special purpose controller computes the inverse of far end correlation matrix (IFECM(n)) in step 330. To save computations, (IFECM(n)) can be computed recursively using IFECM(n-1) using known matrix inversion techniques.

The taps are updated in step 335. The taps are updated using Equations (15) and (16) below.

$$tm(n+1)=tm(n)+\mu FEM(n)\cdot IFECM(n)\cdot em(n) \quad \text{EQN (15)}$$

$$s(n+1)=s(n)+\mu \times X(n) \times \Pi^{-1}(n) \times e(n) \quad \text{EQN (16)}$$

The process then increments to the next time instant (e.g. time instant=n+1) in step 340. Thereafter the process proceeds to step 305 for the time instant=n+1.

In the SAP process of FIG. 3, the step size μ and the regularization factor δ are fixed in steps 320 and 325. Embodiments of the present disclosure utilize processes wherein the step size μ and the regularization factor δ are not fixed. A step size control logic (e.g. in the VSS 154) can determine an optimum μ in step 320 while keeping a constant δ in step 325. Additionally and alternatively, the VSS 154 can determine an optimum δ in step 325 while keeping a constant μ in step 320.

Figure 4:
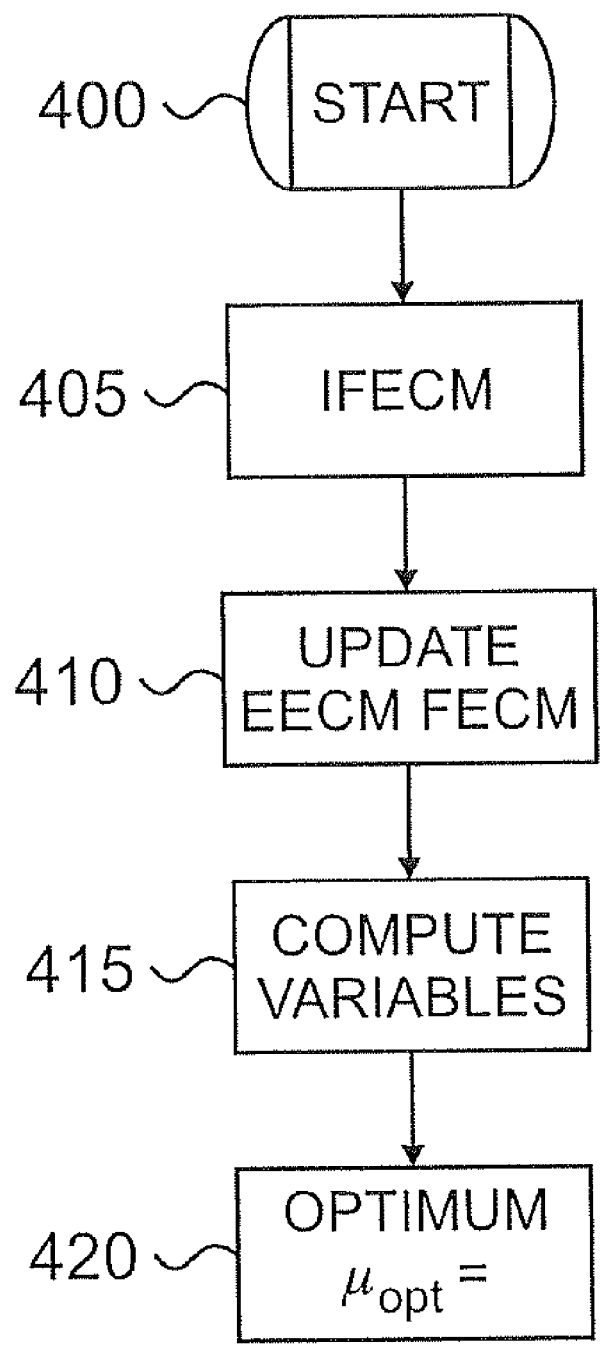
FIG. 4 illustrates a simple block diagram for echo cancellation using methods of delay coefficients according to embodiments of the present disclosure.

In another embodiment, illustrated in FIG. 4, a VSS process utilizing a method of Delay coefficients is utilized for echo cancellation. The process of determining μ, for insertion at step 320, starts at step 400. A process initialization occurs at time instant n=0. During process initialization, $\delta_{init}$ is set to twenty (20) times the sum of subband powers of far end signal u(n). Further during process initialization, α is set to zero point nine (0.9), and the expectation of the error correlation matrix (EECM(n)) is set to zero (0) as follows:

$$R_E(0) = \begin{bmatrix} 0 & 0 & \cdots & 0 \\ 0 & 0 & \cdots & 0 \\ \vdots & \vdots & \ddots & \vdots \\ 0 & 0 & \cdots & 0 \end{bmatrix}_{MP_s \times MP_s}$$

The processor or special purpose controller computes the inverse of the far end correlation matrix (IFECM(n)) in step 405. In step 410, EECM(n) is updated based on Equation (8) and FECM(n) is updated based on Equation (6) above. The calculation of FECM(n) involves the computation of non-zero lags of the Autocorrelation Function (hereinafter "ACF") of the far end signal.

The process moves to step 415 wherein the processor or special purpose controller computes variables. The variables computed are numerator, denominator and MSTE(n). The numerator is calculated as TR(FECM(n)×IFECM(n)). The denominator is calculated as TR(EECM(n)×IFECM(n)).

Thereafter, the processor or special purpose controller calculates the optimum step size μ in step 420. The optimum μ is calculated using Equation (17) below and $D^2$ is calculated using Equation (3) above. The value is clipped between zero (0) and two (2).

$$\mu_{opt}(n) = \frac{1}{L}D^2(n)\frac{\text{numerator}}{\text{denominator}} \quad \text{EQN (17)}$$

The final form of the optimum μ can be expressed as:

$$\mu_{opt}(n) = \frac{MSTE(n)\cdot Tr(FECM(n)\times IFECM(n))}{L\cdot Tr(EECM(n)\times IFECM(n))} \quad \text{EQN (20)}$$

Figure 5:
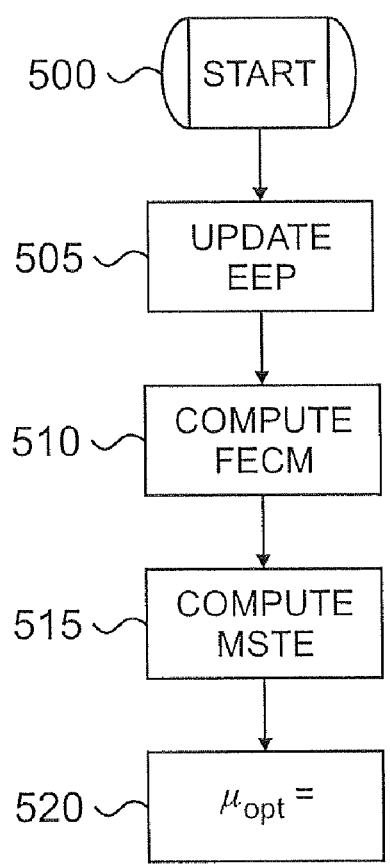
FIG. 5 illustrates a simple block diagram for echo cancellation using a method of non-parametric variable step size according to one embodiment of the present disclosure.

In yet another embodiment, illustrated in FIG. 5, an process utilizing a method of Non-Parametric Variable Step Size is utilized for echo cancellation. The process for determining μ, for insertion at step 320, starts at step 500. A process initialization occurs at time instant n=0. During process initialization, $\delta_{init}$ is set to twenty (20) times the sum of subband powers of far end signal u(n). Further during process initialization, α is set to zero point nine (0.9), and ecorre is set to zero (0).

The processor or special purpose controller updates EEP(n) in step 505. In step 510, the processor or special purpose controller computes the far end correlation matrix (FECM(n)). Then, in step 515, the processor or special purpose controller computes MSTE(n) using Equation (3) above. Additionally, the processor or special purpose controller computes BNP(n) using Equation (11) above.

Thereafter, the processor or special purpose controller calculates the optimum step size μ in step 520. The optimum μ is calculated using Equation (21) below where ψ is a small positive constant (e.g. 0.0001) to prevent division by zero (0). The optimum μ is clipped between zero (0) and two (2).

$$\mu_{opt}(n) = \begin{cases} 1 - \sqrt{\dfrac{BNP(n)}{\psi + EEP(n)}} & EEP(n) > \hat{\sigma}^2 \\ 0 & EEP(n) < \hat{\sigma}^2 \end{cases} \quad \text{EQN (21)}$$

Figure 6:
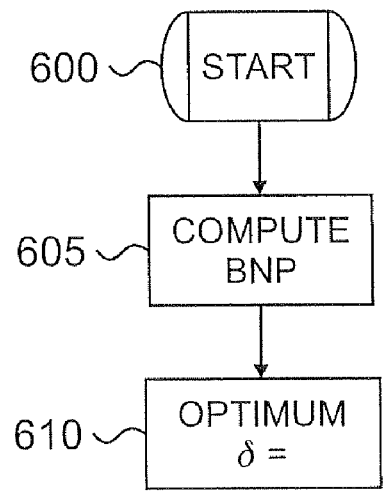
FIG. 6 illustrates a simple block diagram for echo cancellation using a method of variable regularization factor according to one embodiment of the present disclosure.

In still another embodiment, illustrated in FIG. 6, an process utilizing a method of Variable Regularization Factor is utilized for echo cancellation. The process for determining δ, for insertion at step 325, starts at step 600. A process initialization occurs at time instant n=0. During process initialization, μ is set to one (1), α is set to zero point nine (0.9), and ecorre is set to zero (0).

The processor or special purpose controller computes BNP (n) in step 605. Thereafter, the processor or special purpose controller calculates the optimum regularization factor δ in step 610. The optimum regularization factor ($\delta_{opt}$(n) or BETA (n)) is given by Equation (22) below.

$$\delta_{opt}(n) = \dfrac{BNP(n) \cdot L}{P \times MSTE(n)} \quad \text{EQN (22)}$$

Figure 7:
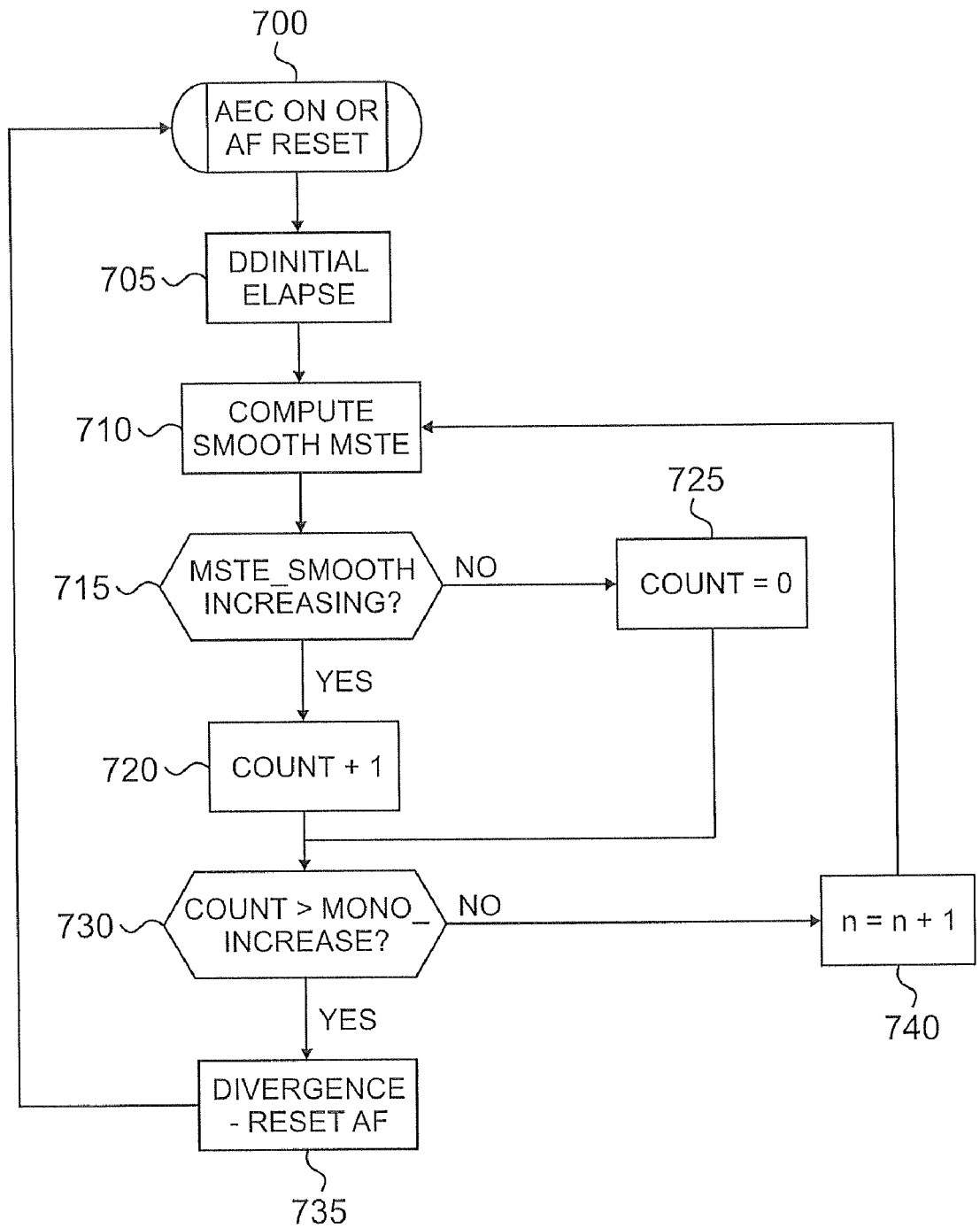
FIG. 7 illustrates a simple block diagram illustrating the operation of a Divergence Detector according to one embodiment of the present disclosure.

Referring now to FIG. 7, a simple block diagram illustrating the operation of a Divergence Detector 164 according to embodiments of the present disclosure is depicted. The Divergence Detector 164 is configured to detect whether or not the AF 152 is diverging. For example, if the echo path changes drastically, the AF 152 may diverge. If the AF 152 diverges, the Divergence Detector 164 is configured to detect the divergence and reset the AF 152. The Divergence Detector 164 resets the AF 152 to an initial AF setting such that a quick reconvergence of the AF 152 to new system conditions can occur.

The process commences at step 700 where either the AEC 150 turns-on or when the AF 152 has been reset. In step 705, the Divergence Detector 164 waits for a period of DDinitial seconds to elapse, e.g. four seconds. It would be understood that illustration of a DDintial seconds equaling four seconds is exemplary and many other time durations can be established for the DDinitial seconds period. After DDinitial seconds elapses, the Divergence Detector 164 is configured to compute a smooth version of MSTE(n).

The process moves to step 710 wherein a smooth version of MSTE(n) is computed. The smooth version of MSTE(n) is referenced as MSTE_SMOOTH(n). If MSTE_SMOOTH(n) monotonically increases over a MONO_INCREASE samples, the Divergence Detector 164 declares a divergence and resets the AF 152. In order to determine if MSTE_SMOOTH(n) is monotonically increasing over MONO_INCREASE samples, the Divergence Detector 164 computes MSTE_SMOOTH(n) using Equation (23) below and stores MSTE_SMOOTH(n) to a memory (not illustrated):

$$\text{MSTE\_SMOOTH}(n)=0.999*\text{MSTE\_SMOOTH}(n-1)+0.001*\text{MSTE}(n) \quad \text{EQN (23)}$$

In step 715 the Divergence Detector 164 determines if MSTE_SMOOTH(n) is increasing over time. The Divergence Detector 164 compares MSTE_SMOOTH(n) with MSTE_SMOOTH(n−1). If MSTE_SMOOTH(n)>MSTE_SMOOTH(n−1), then the process moves to step 720. If MSTE_SMOOTH(n)<MSTE_SMOOTH(n−1), then the process proceeds to step 725.

In step 720, a count is incremented by one such that count=count+1. In step 725, the count is maintained such that count=0. Thereafter, the process proceeds to step 730.

In step 730, the Divergence Detector 164 compares the count to a predetermined value, MONO_INCREASE. If the count is greater than MONO_INCREASE (i.e., count>MONO_INCREASE), the process moves to step 735 wherein the Divergence Detector 164 has determined that a divergence has been detected. In step 735, the Divergence Detector 164 resets the AF 152 and returns to step 700. However, if count<MONO_INCREASE, the process moves to step 740 wherein the time period is incremented such that n=n+1 and the process returns to step 710 to compute the next MSTE_SMOOTH(n).

Figure 8:
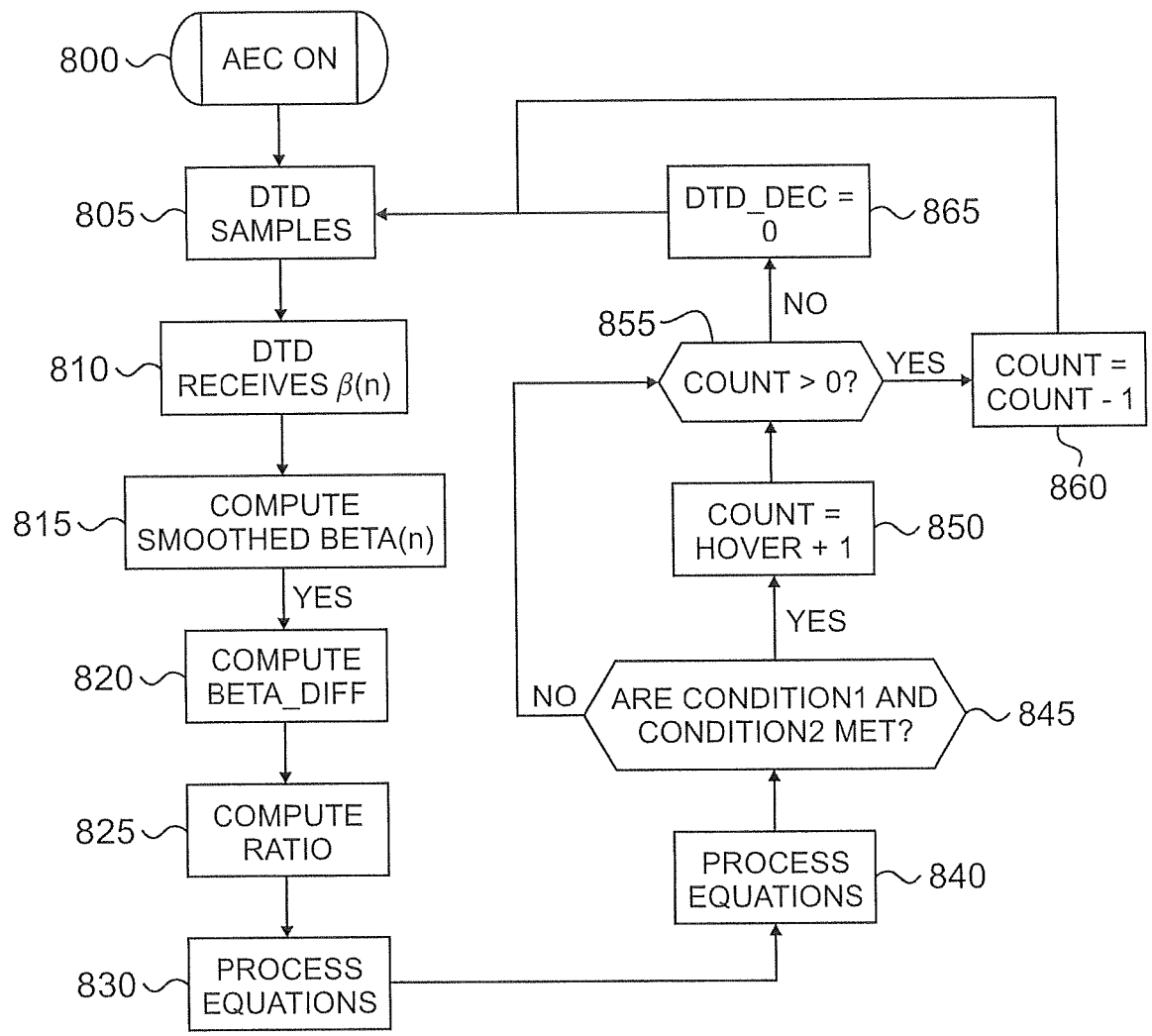
FIG. 8 illustrates a simple block diagram illustrating the operation of a Double Talk Detector (DTD) 156 according to one embodiment of the present disclosure.

Referring now to FIG. 8, a simple block diagram illustrating the operation of a Double Talk Detector (DTD) 156 according to embodiments of the present disclosure is depicted. As stated herein above, the DTD 156 is configured to output a "1" in response to the DTD 156 detecting DT. If DT is not detected, the DTD 156 outputs a "0". The output of the DTD 156 is input into MUX 158. If the MUX 158 receives a "1" from the DTD 156, the MUX 158 passes the AEC output 160 to the far-end. If the MUX 158 receives a "0" from the DTD 156, the MUX 158 masks the AEC output 160 and passes a comfort noise 162 to the far-end. As such, a residual echo, which remained in the AEC output 160 because it was not cancelled by the AF 152, is not present in the signal 150 transmitted to the far end.

The process commences at step 800 wherein the AEC 150 is turned-on. For the purposes of illustration, an exemplary embodiment using a delay coefficients based method of VSS, described in further detail with reference to FIG. 6 above, is utilized.

In step 810, the DTD 156 receives, as an input from the VSS 154, the regularization factor from a delay coefficients based variable regularization method of the VSS 154. The regularization factor is denoted in FIG. 2 as BETA=β(n) 170. The DTD 156 also receives, as an input, EESP(n) and NESPE(n).

In step 815, the DTD 156 computes a smoothed version of BETA(n). The smoothed version of BETA(n) is referenced as BETA_SMOOTH(n). BETA_SMOOTH(n) is calculated using Equation (24) below.

$$\text{BETA\_SMOOTH}(n)=0.9*\text{BETA\_SMOOTH}(n-1)+0.1*\text{BETA}(n) \quad \text{EQN (24)}$$

The process moves to step 820 wherein another quantity, BETA_DIFF, is computed using Equation (25) below.

$$\text{BETA\_DIFF}(n)=\text{BETA\_SMOOTH}(n)-\text{BETA\_SMOOTH}(n-1) \quad \text{EQN (25)}$$

In step 825, the DTD 156 computes a ratio, CCDTD. The ratio, CCDTD, is computed using Equation (26) below.

$$\text{CCDTD}(n)=\text{EESP}(n)/\text{NESPE}(n) \quad \text{EQN (26)}$$

Then, the DTD 156 processes Equations (24), (25) and (26) in step 830.

The DTD 156 processes a pseudo-code for using the two conditions. Then, the DTD 156 evaluates two conditions in step 840. More specifically, the DTD 156 evaluations a CONDITION1 and CONDITION2. DT is detected if both conditions are satisfied. If both conditions are not satisfied, DT is absent. CONDITION1 is defined as BETA_DIFF(n)>BETA_THRESHOLD. CONDITION2 is defined as CCDTD(n)<CCDTD_THRESHOLD.

In step 845, the DTD 156 determines if CONDITION1 and CONDITION2 are satisfied. If both are satisfied, the process moves to step 850 where the count is set such that COUNT=HOVER+1. Then, the process moves to step 855 where value of COUNT is checked. In step 845, if one of CONDITION 1 and CONDITION 2, or both, are not satisfied (e.g, the conditions fail), the process moves to step 855. Then, in step 855, the DTD 156 determines if the count is greater than zero (0),i.e. count>0. If count>0, then the process moves to step 860. In step 860, the count is reduced by one such that count=count-1, the value s(n) is set to s(n)=$S_{REF}$ (i.e., no tap update performed) and a value DTD_DEC is set to DTD_DEC=1. If the count is less than zero (0), i.e. count<0, in step 855, then the process moves to step 865 wherein DTD_DEC=0 and a VSS tap update is performed.

It should be noted that, at any instant, the process is either in step 865 or step 860. After steps 860 and 865, the process goes back to step 805, i.e., the process goes back to the next time instant and starts a new set of processing.

The tap s(n) is stored in a memory (not illustrated) Once in every ONCE_IN samples, the tap s(n) is stored in memory. The latest stored tap in memory which is MONO_INCREASE time samples before a divergence detection event, if any, is always stored into SREF. The value of ONCE IN could be set to be within the range of 2000-8000 samples.

Figure 9:
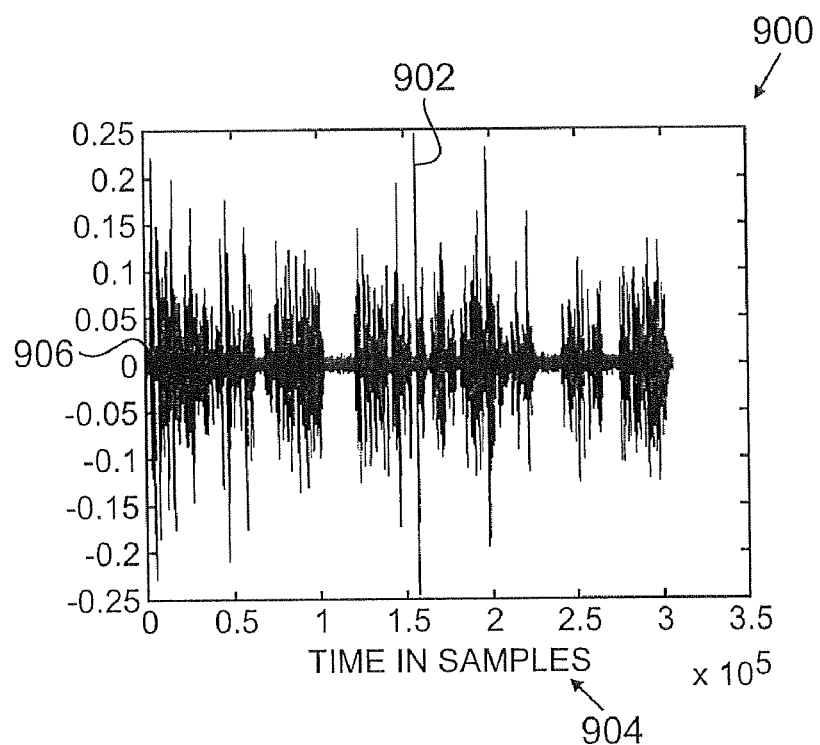
FIG. 9 illustrates a simple output graph utilizing processes for echo cancellations.

Referring now to FIG. 9, a graph 900 of an echo and a cancelled echo for a constant step size is illustrated. The graph 900 illustrates echo cancellation using an process wherein a step size control logic is not utilized. As such, the step size is fixed (e.g. μ=1).

The echo f 902 is measured over several samples 1004. Additionally, the estimated echo f' not illustrated) is measured over several time samples 904. A residual echo 906 is obtained by cancelling the estimated echo f' from the echo 902 (i.e., f–f'). As illustrated in the graph 900, the residual echo 906 is huge and dominant. A huge and dominant residual echo 906 indicates that the adaptive filter 110 is diverging.

Figure 10:
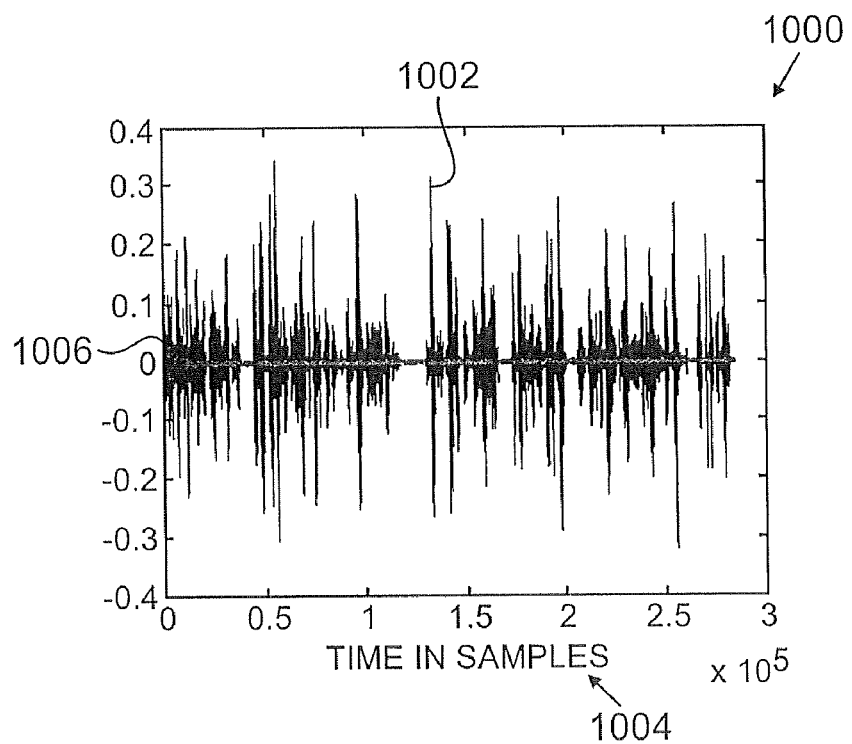
FIG. 10 illustrates a simple output graph utilizing echo cancellation processes according to embodiments of the present disclosure.

Referring now to FIG. 10, a graph 1000 of an echo and a cancelled echo using step size control logic is illustrated. The graph 1000 illustrates echo cancellation using an process wherein control logic determines at least one of the step size (e.g. determine optimum μ) and the regularization factor (e.g. determine optimum δ) according to embodiments of the present disclosure.

The echo f 1002 is measured over several samples 1004. Additionally, the residual echo (f–f') 1006 is measured over several time samples 1004. As illustrated in the graph 1000, the residual echo 1006 is very small and minimal.

Figure 11:
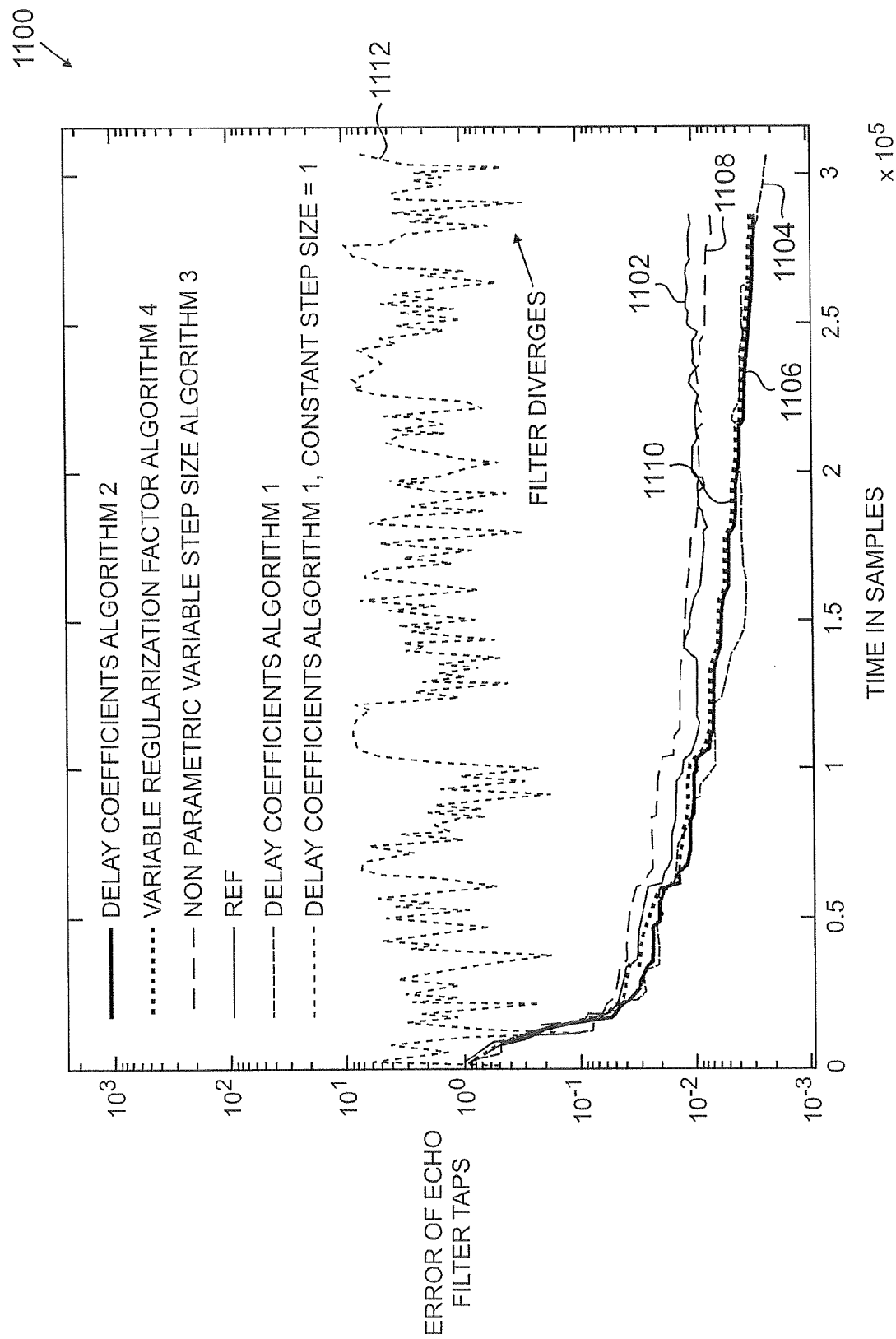
FIG. 11 illustrates a simple output graph utilizing mean square tap error according to embodiments of the present disclosure.

Referring now to FIG. 11, a graph 1100 of the mean square tap error is plotted. The graph 1100 illustrates plots for processes according to embodiments of the present disclosure. A first plot 1102 illustrates performance of a prior art process. A second plot 1104 illustrates performance the first delay coefficients process. A third plot 1106 illustrates performance the second delay coefficients process. A fourth plot 1108 illustrates performance of the non parametric variable step size process. A fifth plot 1110 illustrates performance of the variable regularization factor process. A sixth plot 1112 illustrates performance of the delay coefficients process with a constant step size μ=1.

The graph 1100 illustrates that for the first through fifth plots 1102-1110, the mean square tap error decreases with time. The decrease of the mean square tap error over time indicates that the adaptive filter 110 does not diverge. However, the graph 1100 illustrates that for the sixth plot 1112, the mean square tap error over time increases. As such, when using a constant step size μ=1 and no step size control logic, the adaptive filter 110 diverges.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A device for Acoustic Echo Cancelling in communications equipment, the Acoustic Echo Cancelling device comprising:
   a near end interface;
   a far end interface;
   an adaptive filter coupled between the near end interface and the far end interface;
   a variable step size controller coupled to the adaptive filter, the variable step size controller comprising
   a processor,
   a computer readable medium, and
   a plurality of instructions wherein at least a portion of the plurality of instructions are storable in the computer readable medium, and further wherein the plurality of instructions are configured to cause the processor to determine at least one of a step size and a regularization factor, wherein the at least one of the step size and the regularization factor is transmitted to the adaptive filter to provide an estimated echo signal; and
   a divergence detector coupled to the adaptive filter, the divergence detector configured to detect divergence of the adaptive filter and to reset the adaptive filter in response to detecting divergence of the adaptive filter.

2. The device of claim 1, the device further comprising a double talk detector coupled to the variable step size controller, the double talk detector configured to detect an occurrence of a double talk and transmit an output signal to indicate the occurrence of the double talk.

3. The device of claim 2, the device further comprising a multiplexor coupled between the near end interface and the far end interface, the multiplexor adapted to mask an AEC output signal.

4. The device of claim 3, wherein the output signal from the double talk detector is a double talk (DT) detected signal transmitted to an input of the multiplexor and wherein the multiplexor masks the AEC output signal in response to receiving the DT detected signal.

5. The device of claim 1, wherein the processor determines the step size by:
   computing an inverse far end correlation matrix;
   updating an expectation of error correlation matrix;
   updating a far end correlation matrix;
   computing a plurality of variables, the plurality of variables comprising a numerator, denominator and a mean-square tap error (MSTE); and
   calculating the step size based on a product of the MSTE, the numerator and the denominator.

6. The device of claim 1, wherein the processor determines the step size by:
   updating an expectation of error power;
   computing a far end correlation matrix and a background noise power;
   computing a mean-square tap error (MSTE); and
   calculating the step size based on the MSTE, the expectation of error power and the background noise power.

7. The device of claim 1, wherein the processor determines the regularization factor by:
   computing background noise power; and
   calculating the regularization factor based on the background noise power.

8. A communication device comprising:
   at least one speaker configured to broadcast a far end signal;

at least one audio input configured to receive an audio sound; and an Acoustic Echo Cancelling (AEC) apparatus, the AEC apparatus comprising:
 a near end interface coupled to the at least one audio input;
 a far end interface configured to receive the far end signal;
 an adaptive filter coupled between the near end interface and the far end interface;
a variable step size controller coupled to adaptive filter, variable step size controller comprising
 a processor,
 a computer readable medium, and
 a plurality of instructions wherein at least a portion of the plurality of instructions are storable in the computer readable medium, and further wherein the plurality of instructions are configured to cause the processor to determine at least one of a step size and a regularization factor, wherein said at least one of the step size and the regularization factor is transmitted to the adaptive filter to provide an estimated echo signal; and
 a divergence detector coupled to the adaptive filter, the divergence detector configured to detect divergence of the adaptive filter and to reset the adaptive filter in response to detecting divergence of the adaptive filter.

9. The communication device of claim 8, the AEC apparatus further comprising a double talk detector coupled to the variable step size controller, the double talk detector configured to detect an occurrence of a double talk and transmit an output signal to indicate the occurrence of the double talk.

10. The communication device of claim 9, the AEC apparatus further comprising a multiplexor coupled between the near end interface and the far end interface, the multiplexor adapted to mask an AEC output signal.

11. The communication device of claim 10, wherein the output signal from the double talk detector is a double talk (DT) detected signal transmitted to an input of the multiplexor, wherein the multiplexor masks the AEC output signal in response to receiving the DT detected signal.

12. The communication device of claim 1, wherein the variable step size controller is configured to:
 compute an inverse far end correlation matrix;
 update an expectation of error correlation matrix;
 update a far end correlation matrix;
 compute a plurality of variables, the plurality of variables comprising a numerator, denominator and a mean-square tap error (MSTE); and
 calculate the step size based on a product of the MSTE, the numerator and the denominator.

13. The communication device of claim 8, wherein the variable step size controller is configured to:
 update an expectation of error power;
 compute a far end correlation matrix and a background noise power;
 compute a mean-square tap error (MSTE); and
 calculate the step size based on the MSTE, the expectation of error power and the background noise power.

14. The communication device of claim 8, wherein the variable step size controller is configured to:
 compute background noise power; and
 calculate said regularization factor based on said background noise power.

15. A device for Acoustic Echo Cancelling in communications equipment, the Acoustic Echo Cancelling device comprising:
 a near end interface coupled to an audio input device;
 a far end interface configured to receive a far end signal;
 an adaptive filter coupled between the near end interface and the far end interface;
 a variable step size controller coupled to said adaptive filter, said variable step size controller comprising
  a processor,
  a computer readable medium, and
  a plurality of instructions wherein at least a portion of the plurality of instructions are storable in the computer readable medium, and further wherein the plurality of instructions are configured to cause the processor to determine at least one of a step size and a regularization factor, wherein said at least one of the step size and the regularization factor is transmitted to the adaptive filter to provide an estimated echo signal;
 a divergence detector coupled to the adaptive filter, the divergence detector configured to detect divergence of the adaptive filter and to reset the adaptive filter in response to detecting divergence of the adaptive filter; and
 a double talk detector coupled to the variable step size controller, the double talk detector configured to detect an occurrence of a double talk and transmit an output signal to indicate the occurrence of the double talk.

* * * * *

UNITED STATES PATENT AND TRADEMARK OFFICE
CERTIFICATE OF CORRECTION

PATENT NO.         : 8,254,588 B2                                           Page 1 of 1
APPLICATION NO.    : 12/288922
DATED              : August 28, 2012
INVENTOR(S)        : Muralidhar Karthik, Sapna George and Anoop Kumar Krishna It is certified that error appears in the above-identified patent and that said Letters Patent is hereby corrected as shown below:

Title page, at Item (75), please delete the inventor's name "George Sapna" and insert
-- Sapna George --.

Signed and Sealed this
Eighteenth Day of February, 2014

Michelle K. Lee
*Deputy Director of the United States Patent and Trademark Office*